United States Patent [19]
Niederer

[11] 3,839,989
[45] Oct. 8, 1974

[54] EGG OILER

[76] Inventor: Otto C. Niederer, Bear Tavern Rd., Titusville, N.J. 08560

[22] Filed: Mar. 8, 1972

[21] Appl. No.: 232,692

[52] U.S. Cl........ 118/13, 118/DIG. 6, 118/DIG. 15, 118/264
[51] Int. Cl. ............................................. B05c 1/06
[58] Field of Search ... 118/DIG. 6, 30, 13, DIG. 15, 118/262, 264, 267

[56] References Cited
UNITED STATES PATENTS

| | | | |
|---|---|---|---|
| 2,478,318 | 8/1949 | Raub | 118/267 X |
| 2,885,995 | 5/1959 | Schluter | 118/264 X |
| 2,153,296 | 4/1939 | Brodgen | 118/DIG. 6 |
| 1,925,511 | 9/1933 | Whitmore | 118/30 |
| 2,428,115 | 9/1947 | Howard | 118/30 |

*Primary Examiner*—Louis K. Rimrodt
*Attorney, Agent, or Firm*—Sperry and Zoda

[57] ABSTRACT

A device for oiling eggs is provided with a roller having a spongelike, surface positioned to contact the upper portion of eggs arranged in cartons or on egg flats or supported on a conveyor and moved past the roller. Means are provided for delivering metered amounts of oil to the roller at points in advance of the point of contact of the roller with the eggs and in alignment with the eggs being moved past the roller.

3 Claims, 3 Drawing Figures

PATENTED OCT 8 1974  3,839,989

EGG OILER

FIELD OF INVENTION

It is common practice in the egg industry to apply a preservative oil to eggs to reduce the passage of air, moisture or other gases through the shells of the eggs with resulting deterioration of the eggs. It is only important to apply such oil to the larger ends of the eggs where the air cell is located although in some cases the entire egg may have oil applied thereto.

The egg oiling devices heretofore provided have generally included spray nozzles or jets by which the oil is sprayed onto the eggs in a controlled manner as exemplified by U.S. Pat. Nos. 3,184,063; 2,673,515; 2,876,110 and 2,919,639. However, the amount of oil thus applied to the eggs is frequently in excess of that required and at least part of the oil may spray outward or be splashed or drip onto the supports for the eggs and adjacent surfaces. For this reason it has been usual to oil the eggs before they are arranged in cartons or on egg flats which might be stained by the oil during the spraying or other egg oiling operation.

In accordance with the present invention novel means are provided for applying oil to eggs wich may be arranged in egg cartons or on egg flats or otherwise supported in a predetermined arrangement on a conveyor or support movable past the egg oiling means.

In the preferred embodiments of the invention herein shown and described a roller presenting a soft, yieldable, porous or sponge-like surface is positioned adjacent and preferably above a conveyor upon which the eggs are supported and arranged in an upright position so as to engage the upwardly facing air cell containing ends of the eggs as they move past the roller. Means are then provided for applying a metered amount of oil to the roller at points in advance of and in alignment with the eggs for transfer by the roller to the eggs during movement of the eggs past the roller.

The yielding contact and the sponge-like character of the roller serve to cause an adequate, but not excessive, amount of oil to be applied to each egg without danger of contact with other surfaces adjacent the eggs. Moreover, by properly positioning the roller with respect to the support for the eggs, a larger amount of oil will be squeezed out of the sponge-like material and onto large eggs than will be applied to smaller eggs which engage the roller over a more limited area and compress the sponge-like material to a lesser extent.

THE DRAWINGS

PREFERRED EMBODIMENT OF THE PRESENT INVENTION

Figure 1:
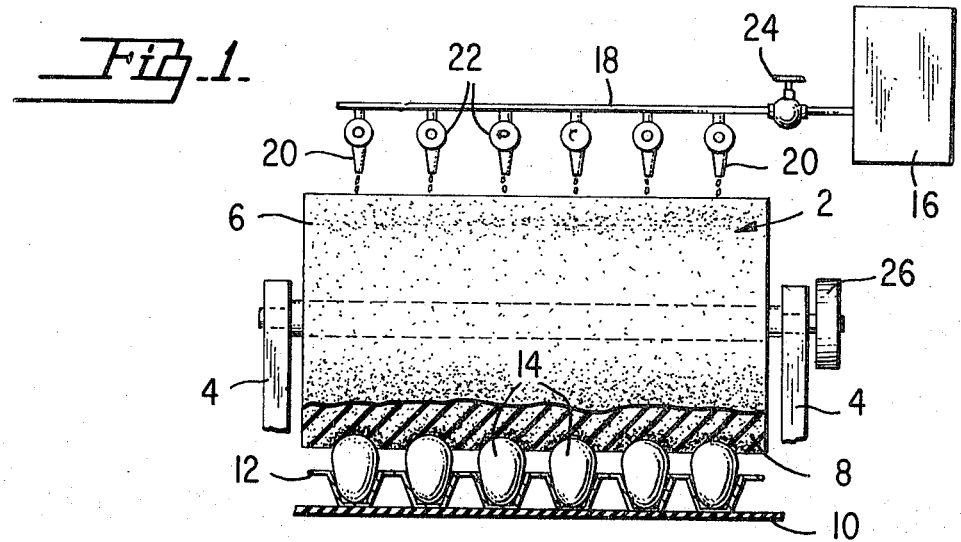
FIG. 1 is a front elevation of one typical form of egg oiling device embodying the present invention.

In that form of the invention chosen for purposes of illustration in FIG. 1 of the drawing the equipment comprises a roller 2 supported at its ends by pillar box 4 for rotation about a horizontal axis. The outer surface 6 of the roller is provided with a relatively thick layer of porous or sponge-like material 8 which may be formed of foamed plastic material, soft felt, or the like.

The outer surface 6 of the roller is spaced from a support 10 such as a conveyor by which a conventional filler flat 12 having eggs 14 arranged therein is movable past the roller 2. The surface 6 of the roller 2 is spaced from the conveyor 10 and the filler flat 12 a sufficient distance to cause the lower portion of the roller to engage the upper ends of the eggs 14 arranged in the filler flat. At the same time, the roller should be elevated sufficiently above the conveyor 10 to avoid contact of the surface of the roller with the filler flat 12.

The oil to be applied to the eggs 14 is supplied from a reservoir 16 through a line 18 having nozzles 20 connected thereto and spaced apart axially of the roller 2 in position to be in vertical alignment with the eggs 14 arranged in the filler flat 12. Each of the nozzles 20 is provided with a valve or metering device 22 whereas the main control valve 24 is located in the line 18 between the reservoir 16 and the various nozzles 20. In this way the amount of oil supplied to the line 18 and nozzles 20 can be regulated by the valve 24, whereas the amount of oil actually issuing from the various nozzles 20 can be individually controlled by the valves or metering devices 22. In this way, controlled amounts of oil can be dripped or sprayed onto the upper portion of the roll 2 so as to be taken up and held by the sponge-like material 8 on the outer surface of the roller.

With this construction the eggs 14 can be arranged on the support or conveyor 10 for movement past the roller 2 with the upper portions of the eggs 14 each contacting the sponge-like material in such a way as to compress the material 8 so as to squeeze the oil therefrom in a manner to coat the upper portions of the eggs with oil and permit a limited amount of the oil to flow downward about the exposed upper portions of the eggs arranged in the filler flat.

The roller 2 may be rotated by contact with the eggs 14 as they are advanced with the conveyor 10 so that a renewed zone or area of the sponge-like material will be brought into engagement with the following eggs arranged in the filler flat. While the roller 2 may be positively rotated by suitable drive means 26 if desired, it is normally preferred to effect the rotation of the roller 2 solely by engagement of the lower portion of the roller with the eggs being moved past the roller and beneath the same by the conveyor 10. In this way, a fresh oil carrying portion of the roller 2 will be brought into engagement with each egg and the amount of oil which must be supplied to the sponge-like material 8 from the nozzles 20 can be limited in such a way as to preclude the application of excessive oil to any of the eggs. Moreover, the eggs themselves will automatically serve to control the amount of oil applied thereto in that large eggs will compress the sponge-like material 8 to a greater extent than small eggs so as to squeeze a larger quantity of oil from the sponge-like material to assure effective oiling of the eggs substantially independently of the size of the individual eggs.

While it is generally preferred to locate the nozzles 20 near the upper portion of the roller 2, it is only necessary that the oil be supplied to the sponge-like material 8 of the roller at a point thereon in advance of the point at which the roller will engage the eggs and preferably in alignment with longitudinally extending rows of eggs arranged on the conveyor 10 or in filler flats, egg cartons, or other receptacles or egg positioning means on the conveyor.

Figure 2:
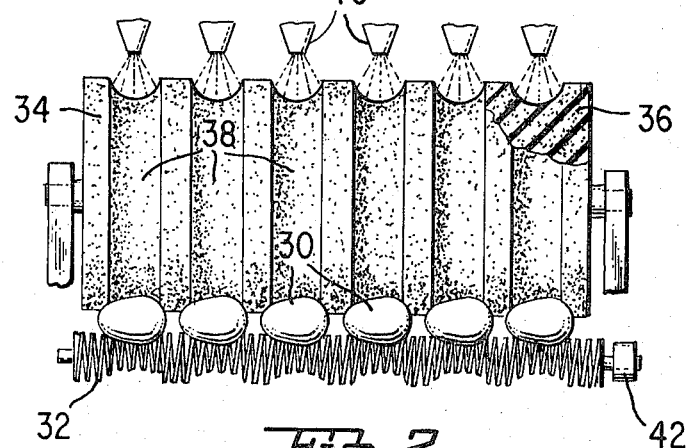
FIG. 2 is a front elevation of a portion of an alternative form of the present invention.

In that form of the invention illustrated in FIG. 2 the support for the eggs 30 to be oiled is shown as consisting of rollers 32 on which the eggs are arranged in rows with the long axis of the eggs extending parallel to the axis of the roller 34. The roller is of the type shown and described in connection with FIG. 1, in that it has the outer egg contacting surface thereof provided with the thick yieldable layer of sponge-like material 36 for receiving and holding the oil to be applied to the eggs 30. However, the outer surface of the roll is provided with grooves or channels 38 extending about the circumference of the roller in alignment with the rows of eggs 40 supported on the rollers 32. Nozzles or oil supplying means 40 are centered with respect to the grooves or channels 38 so as to apply oil to those portions of the roller which will engage the eggs 30. The sides or surfaces of the grooves 38 are rounded to conform generally to the surface of the eggs supported on the rollers 32 and if desired, the eggs being oiled may be rotated by rotating the egg supporting rollers 32 by suitable means indicated generally at 42. In this way, substantially the complete surface of the eggs may be contacted by the sponge-like material of the roller as the eggs are moved beneath the roller 34 and in contact therewith.

Figure 3:
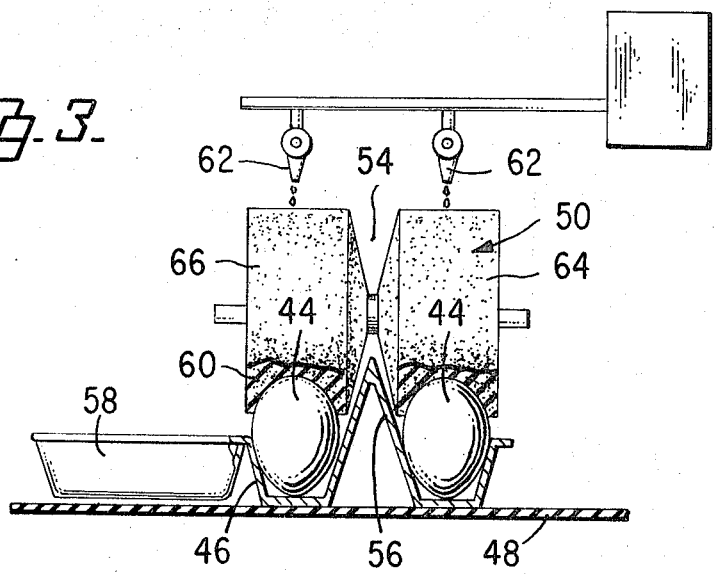
FIG. 3 is a view similar to FIG. 2 illustrating a further alternative embodiment of the invention.

In that form of the invention illustrated in FIG. 3, the egg oiling equipment is designed to apply oil to the upper surface of eggs 44 arranged in egg cartons 46 positioned longitudinally on the upper surface of the conveyor 48 so as to be moved past the roller 50 in a manner to apply oil to the upper portions of the eggs 44 while they are arranged and supported in the egg receiving cavities 52 of the egg carton 46.

Further, as shown in FIG. 3, the roller 50 may have a central groove 54 therein of sufficient depth and configuration to permit eggs arranged in cartons having the central "pillar-post" 56 designed to prevent the cover of the carton from being forced downward against the eggs when the carton is closed to a position in which the cover 58 might be moved downward into a position in which it would crush or damage the eggs arranged in the carton. However, the equipment of FIG. 3 can also be used for applying oil to the upper portions of eggs arranged in any conventional type of egg carton movable with the conveyor 48 past the egg oiling equipment.

When using the equipment of FIG. 3 to apply oil to eggs arranged in parallel rows in an egg carton, it is only necessary to apply oil to the sponge-like material 60 of the roller at two points as indicated by the nozzles 62 arranged in alignment with those portions 64 and 66 of the roller which will be brought into contact with the upper surfaces of the eggs as the conveyor 48 and cartons 46 move the eggs into and out of contact with the sponge-like material 60 of the tube portions 64 and 66 of the roller 50.

In each of the forms of the invention shown and described above a limited amount of oil, sufficient to assure effective application thereof to at least the upper portion of the eggs is applied to each egg individually without discharge or loss of oil onto the cartons, filler flats or other surfaces where it would be wasted or accumulate in an undesirable manner. Furthermore, the equipment operates automatically to apply a greater amount of oil to larger eggs than to small eggs, whereas the metering of the oil to assure the effective and desired oiling of the eggs is readily accomplished.

Although three typical embodiments of the present invention have been shown and described, it will be apparent that various changes and modifications may be made in the form, construction and arrangement of the elements of the combination. In view thereof, it should be understood that the particular embodiments of the invention shown and described above are intended to be illustrative only and are not intended to limit the scope of the invention.

I claim:

1. Egg oiling equipment embodying a support for the eggs to be oiled, a roller located above said support and spaced therefrom, said roller being formed of a resiliently compressible, porous, sponge-like material retentive of and pervious to the passage of oil in its uncompressed condition, said roller presenting a yieldable surface positioned to contact the upper end portions of eggs on said support, means for moving said support with rows of eggs thereon past said roller with said end portions of the eggs impinging upon said surface of the roller to an extent sufficient to compress the roller material and thereby squeeze the retained oil out of the roller and onto the impinging surfaces of the eggs, and means for supplying oil to the sponge-like material on said roller for transfer to the eggs contacted thereby.

2. Egg oiling equipment as defined in claim 1 wherein the egg contacting surface of said roller has grooves extending circumferentially of the roller in concentricity with the axis of rotation of the roller and conforming generally to the upper surfaces of the eggs to more uniformly compress the material of the roller over the extent of the surface thereof, that is in contact with said end portions of the eggs.

3. Egg oiling equipment as defined in claim 1 wherein the eggs to which oil is applied are arranged in egg cartons having pillars projecting upwardly above the eggs and the cartons are positioned with said pillars aligned longitudinally of a conveyor upon which the eggs and cartons are moved past said roller, said sponge-like material having a groove therein extending circumferentially of the conveyor in position to permit movement of the pillars on the carton past the roller without substantial contact with the sponge-like material on the roller.

\* \* \* \* \*